US006934336B2

(12) United States Patent
Kurohmaru

(10) Patent No.: US 6,934,336 B2
(45) Date of Patent: Aug. 23, 2005

(54) AREA EXPANSION APPARATUS, AREA EXPANSION METHOD, AND AREA EXPANSION PROGRAM

(75) Inventor: Miki Kurohmaru, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 369 days.

(21) Appl. No.: 10/201,569

(22) Filed: Jul. 24, 2002

(65) Prior Publication Data

US 2003/0021484 A1 Jan. 30, 2003

(30) Foreign Application Priority Data

Jul. 26, 2001 (JP) .................................... 2001-226422

(51) Int. Cl.[7] ............................................... H04N 7/18
(52) U.S. Cl. .............................. 375/240.16; 375/240.17
(58) Field of Search ....................... 375/240.12–240.17

(56) References Cited

U.S. PATENT DOCUMENTS 5,872,604 A * 2/1999 Ogura ........................ 348/699
6,078,694 A * 6/2000 Takahashi et al. .......... 382/238
6,418,166 B1 * 7/2002 Wu et al. ............... 375/240.12
6,665,340 B1 * 12/2003 Kimoto ................. 375/240.08

FOREIGN PATENT DOCUMENTS

| JP | 10-304373 | 11/1998 |
|---|---|---|
| JP | 11-220734 | 8/1999 |
| WO | WO98/58495 | 6/1998 |
| WO | WO00/36841 | 12/1998 |

* cited by examiner

Primary Examiner—Andy Rao
(74) Attorney, Agent, or Firm—Steptoe & Johnson LLP

(57) ABSTRACT

The present invention provides an area expansion apparatus, an area expansion method, and an area expansion program, which can reduce an area to be subjected to image area expansion associated with motion compensation, and reduce a consumed power. The area expansion apparatus of the present invention includes a subtracter 804 for subtracting a logical start address 803 of a pixel that is located at the upper-left corner of a reference block from a logical address 802 that successively indicates all pixel data in the reference block, and a converter 805 for converting an obtained address into a physical address 806 with referring to a predetermined table, and reads a pixel from a memory 807 in accordance with the obtained physical address 806.

5 Claims, 9 Drawing Sheets

AREA EXPANSION APPARATUS, AREA EXPANSION METHOD, AND AREA EXPANSION PROGRAM

FIELD OF THE INVENTION

The present invention relates to image compression and decompression and, more particularly, to area expansion in a motion compensation process, which is applicable to standards intended for low bit rates for the purpose of image communication, such as H.263 and MPEG4.

BACKGROUND OF THE INVENTION

At present, according to the standards intended for low bit rates for the purpose of image communication, such as H.263 and MPEG4, the motion compensation is performed to compress data by employing a correlation between frames.

A motion of a moving picture is represented by successive frames which are recorded at certain time intervals. Here, descriptions will be given of two frames which are adjacent to each other in the time axis direction (i.e., a present frame and a previous frame that is temporally antecedent to the present frame).

When the present frame (hereinafter, referred to as a processing target frame) is to be compressed, it is common to divide the frame into plural blocks and then carry out the compression processing in units of these blocks (hereinafter, referred to as processing target blocks). A motion vector search technique of predicting the processing target block on the basis of a similar block (hereinafter, referred to as a reference block) in the previous frame (hereinafter, referred to as a reference frame) to increase the compression efficiency is widely known.

Here, the motion vector search technique will be described in more detail with reference to FIG. 1.

In the compression process, a block in a reference frame 103, which is similar to a processing target block 102 in a processing target frame 101 is searched as shown in FIG. 1. At this time, a range to be searched is limited within a reference area 104. The reference area 104 is allowed to extend to an external area of the reference frame 103. In this case, an expansion processing is carried out in accordance with pixel expansion patterns 1 to 9 as shown in FIG. 4. For example, when the reference area corresponds to pixel expansion pattern 7, pixels in a reference frame 401 are expanded according to a predetermined rule toward the outside of the reference frame as shown in an example 411 of area expansion toward outside the frame. The area expansion processing is a technique that was applied first to the standards intended for low bit rates such as H.263 and MPEG4.

Next, the motion vector will be described with reference to FIG. 2.

Initially, as described above, a block comprising NX pixels×NY pixels within a reference area 202 comprising MX pixels×MY pixels, which has the highest degree of similarity with a processing target block 201 comprising NX pixels×NY pixels is searched. It is assumed here that the processing target block 201 and a reference block 205 have the highest degree of similarity. In this case, a motion vector 204 is represented as (MVx, MVy). Then, the motion compensation is performed on the basis of the motion vector 204. The reference block 205 may comprise not only pixels at integral positions but also pixels at positions of numbers including decimal fractions. In such case, each of MVx and MVy as the factors of the motion vector 204 has naturally a decimal fraction.

The motion vector search is performed as described above, and consequently the direction and the distance by which the processing target block is to be moved, i.e., motion compensated are shown by the motion vector, thereby performing an encoding process for the moving picture. In a decoding process for the moving picture, the motion vector search is not required and only the motion compensation is performed.

However, in this area expansion processing, it should be decided whether each pixel is within or outside the reference frame area, and further expansion of pixels according to the predetermined rule should performed, whereby the operation loads are unfavorably greatly increased.

To solve this problem, "Image processing method and image processor" are disclosed in International Application No. PCT/JP99/06997, which will be described with referring to FIG. 10.

FIG. 10 is a block diagram illustrating a structure of the image processor that is described in this application. As shown in FIG. 10, the image processor includes an image input/output unit 10 for receiving inputted image or outputting images to be displayed; a DMA bus 11 for performing data transfer between the image input/output unit 10 or a coding/decoding unit 13 and an external memory 12; an external memory 12 for storing image data or coded data; and a coding/decoding unit 13 for carrying out a coding/decoding process, with using an effective image data area (area within a reference frame) and an expanded area.

The coding/decoding unit 13 includes a data processing unit 14 for coding/decoding image data; a memory 15 for storing the image data read from the external memory 12; a control unit 16 for outputting contents to be processed and a processing timing to the data processing unit 14, and outputting a start address of an area corresponding to data which are transferred from the memory 15 to the data processing unit 14, to an address generation unit 17; and an address generation unit 17 for controlling the data transfer from the memory 15 to the data processing unit 14.

The address generation unit 17 comprises a two-dimensional address generation unit 18 for generating an address on the basis of setting information from the control unit 16, and an address conversion unit 19 for converting the address generated by the two-dimensional address generation unit 18 into an access address in the memory 15.

The operation of the image processor that is constructed as described above will be described.

An image inputted to the image input/output unit 10 is initially subjected to resolution conversion by the image input/output unit 10 to be converted into an image size corresponding to a coding target, and stored in the external memory 12 via the DAM bus 11.

On the other hand, the coding/decoding unit 13 decides a rectangular area to be read, i.e., an access rectangular area in an expanded logic space which is obtained by adding an expansion area to an effective image data area, and stores image data corresponding to the effective image data area stored in the external memory 12 within the access rectangular area, in the memory 15.

When a coding target image or a decoding target image is transferred from the memory 15 to the data processing unit 14, the control unit 16 decides a data processing rectangular area to be transferred to the data processing unit 14 in the access rectangular area, and sets the setting information for enabling the address generation unit 17 to generate an access address corresponding to the data processing rectangular area.

The address generation unit 17 successively generates an address of the data processing rectangular area on the basis of the setting information. Then, the address conversion unit 19 decides a pixel expansion pattern corresponding to the address generated by the two-dimensional address generation unit 18 by employing a table comprising frames boundary positions in a reference area which are patternized by applying the nine pixel expansion patterns (i.e., pixel expansion patterns 1 to 9) shown in FIG. 4, and converts the generated address into an address within the effective image data area when the address is outside the effective image data area.

The stored data are read from the memory 15 in accordance with the address generated by the address generation unit 17, and outputted to the data processing unit 14.

As described above, it is suggested that the nine pixel expansion patterns (pixel expansion patterns 1 to 9) as shown in FIG. 4 are applied to patternize the frame boundary positions in the reference area, whereby the area expansion processing can be implemented by a relatively small circuit.

However, the area expansion apparatus and area expansion method are inventions which suppose applications requiring both of the coding and decoding processes for moving pictures, including the motion vector search process for deciding a motion vector, for example like videophones, and do not have a suitable structure for applications such as TV broadcasting for which only the decoding process for moving pictures is satisfactory. More specifically, this apparatus is required to have a memory capacity that is necessary for the motion vector search in the image coding process, whereby this structure is over-specification in the applications that requires only the decoding process.

Specific descriptions will be given of a case where fcode=1 in MPEG4. As shown in FIG. 3, a reference area 301 comprising 48 pixels×48 pixels is represented on coordinates with a position of pixel P302 as an origin. Though not shown, a reference block comprises 16 pixels×16 pixels. In this case, since a half-PEL precision search is allowed in MPEG4, data corresponding to a rectangular area comprising at least 17 pixels×17 pixels within the reference area 301 are sufficient to generate the reference block comprising 16 pixels×16 pixels. In the decoding process, it is satisfactory that the apparatus includes a memory that can store 17 pixels×17 pixels. However, the above-mentioned method and apparatus require a memory that can store 48 pixels×48 pixels which are required for the motion vector search in the coding process. More specifically, as shown in FIG. 5, the image decoding process only requires pixels in a reference block 502, while the conventional area expansion apparatus requires a memory having a capacity that can store 2304 pixels in a reference area 501.

Now, it is assumed that data in a reference area including data of a rectangular area comprising 17 pixels×17 pixels are simply subjected to the area expansion processing. In the case of the pixel expansion processing that is disclosed in the above-mentioned International Application No. PCT/JP99/06997, focusing attention to the pixel expansion patterns as shown in FIG. 4, there are only nine patterns of boundaries. Further, the frame boundary is defined by a combination of four demarcation lines. Therefore, the boundary decision conditions and pixel expansion methods corresponding to these conditions are made associated with each other in one-to-one relation. These associated patterns can be easily mounted on a small-scaled circuit.

When the expansion processing is to be implemented within a rectangular area comprising 17 pixels×17 pixels, the reference block 502 may be located at any position in the reference area 501 as shown in FIG. 5. Further, the frame boundary may be located at any position in the rectangular area comprising 17 pixels×17 pixels. Therefore, it is difficult to make the boundary decision conditions and the pixel expansion methods corresponding to the conditions correspond in one-to-one relation, and the boundary decision and the calculation of addresses corresponding to pixels to be expanded must be performed in units of pixels. That is, the calculation for expanding pixels as shown in the example 411 of area expansion toward outside the frame in FIG. 4 must be performed, resulting in the complexity in the expansion processing. As described above, as the frame boundary is located at any position in the rectangular area comprising 17 pixels×17 pixels, the boundary decision and the pixel expansion according to the predetermined rule become complicated.

SUMMARY OF THE INVENTION

The present invention has for its object to provide an area expansion apparatus, an area expansion method, and an area expansion program, which can reduce an image area to be expanded in a motion compensation process and can reduce a consumed power.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an area expansion apparatus which, when generating a reference block comprising plural pixels which are decided in accordance with a motion vector in a reference area of a previous frame that is temporally antecedent to a present frame in a process for decoding a processing target block comprising plural pixels in the present frame area, expands the pixels of the reference block toward outside of the previous frame area when the reference block extends to outside the previous frame area, comprising: a memory for storing pixels in the reference block, located within the previous frame area; and a logical/physical address conversion unit for receiving a logical start address corresponding to a pixel at an upper-left corner of there ference block and a logical address that successively indicates all pixel data in the reference block starting from the logical start address, in a logical space that is laid out on the previous frame, and outputting a physical address that indicates a pixel corresponding to the logical address in the memory, and the pixels stored in the memory are read in accordance with the physical address. Therefore, when the area expansion is carried out at the motion compensation, though the prior art requires a memory having a capacity that can store 48 pixels×48 pixels, a required memory can be reduced to a capacity corresponding to 17 pixels×17 pixels, whereby the area to be expanded is reduced and the consumed power is decreased.

According to a 2nd aspect of the present invention, in the area expansion apparatus of the 1st aspect, the logical/physical address conversion unit comprises: a subtracter for subtracting the logical start address corresponding to a pixel that is located at the upper-left corner of the reference block, from the logical address that successively indicates all pixel data in the reference block; and a converter for converting the address outputted from the subtracter into the physical address. Therefore, the conversion of the logical space into the physical space can be implemented by a relatively small-scaled circuit, whereby the area to be expanded is reduced, and the consumed power is decreased.

According to a 3rd aspect of the present invention, there is provided an area expansion method for, when generating a reference block comprising plural pixels which are decided in accordance with a motion vector in a reference area of a previous frame that is temporally antecedent to a present frame in a process for decoding a processing target block comprising plural pixels in the present frame area, expanding the pixels of the reference block toward outside of the previous frame area when the reference block extends to outside the previous frame area, comprising steps of: temporarily storing pixels in the reference block, located within the previous frame area; converting a logical address that successively indicates all pixel data in the reference block starting from a logical start address corresponding to a pixel that is located at an upper-left corner of the reference block, in a logical space that is laid out on the previous frame, into a physical address that indicates the temporarily stored pixel corresponding to the logical address; and reading the temporarily stored pixels in accordance with the physical address. Therefore, when the area expansion is carried out at the motion compensation, although the prior art requires a memory having a capacity that can store 48 pixels×48 pixels, a required memory can be reduced to a capacity corresponding to 17 pixels×17 pixels, resulting in a reduction of the memory capacity.

According to a 4th aspect of the present invention, in the area expansion method of the 3rd aspect, in the conversion of the logical address into the physical address, the logical start address corresponding to a pixel that is located at the upper-left corner of the reference block is subtracted from the logical address that successively indicates all pixel data in the reference block, and an address obtained by the subtraction is converted into the physical address. Therefore, the conversion of the logical space into the physical space can be implemented by a relatively simple method.

According to a 5th aspect of the present invention, there is provided an area expansion program for enabling a computer to implement a processing for, when generating a reference block comprising plural pixels which are decided in accordance with a motion vector in a reference area of a previous frame that is temporally antecedent to a present frame in a process for decoding a processing target block comprising plural pixels in the present frame area, expanding the pixels of the reference block toward outside of the previous frame area when there ference block extends to outside the previous frame area, and this processing comprises steps of: temporarily storing pixels in the reference block, located within the previous frame area; converting a logical address that successively indicates all pixel data in the reference block starting from a logical start address corresponding to a pixel that is located at an upper-left corner of the reference block, in a logical space that is laid out on the previous frame, into a physical address that indicates the temporarily stored pixel corresponding to the logical address; and reading the temporarily stored pixels in accordance with the physical address. Therefore, the conversion of the logical space into the physical space can be implemented by a relatively simple method, as well as the area expansion processing that can increase the processing speed can be implemented by software.

DETAILED DESCRIPTION OF THE PREFERRED EMBODIMENTS

Hereinafter, an embodiment of the present invention will be described with reference to the drawings. The embodiment shown here is exemplary only, and the present invention is not limited to this embodiment.

[Embodiment 1]

An area expansion apparatus and an area expansion method according to a first embodiment of the present invention will be described. An example where fcode=1 in MPEG4 is described.

An area expansion apparatus according to the first embodiment is invented to minimize the size of the memory in the image processing apparatus that is described in International Application No. PCT/JP99/06997.

Figure 8:
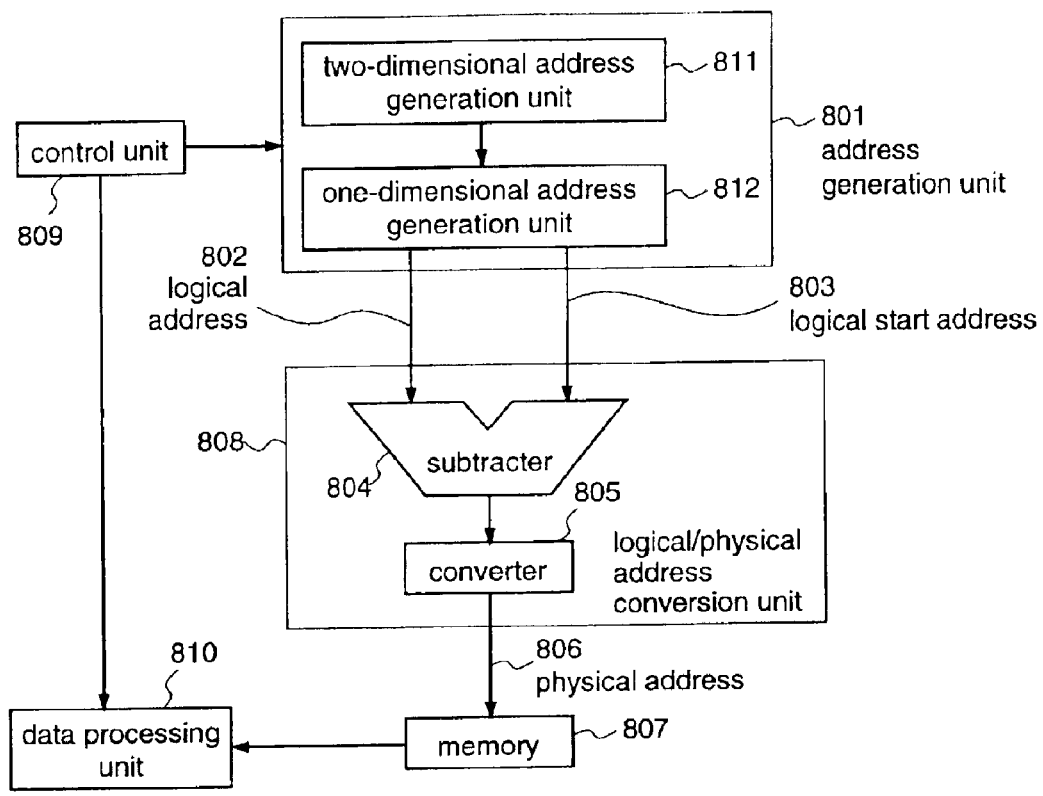
FIG. 8 is a block diagram illustrating an area expansion apparatus according to a first embodiment of the present invention.

FIG. 8 is a block diagram illustrating a structure of the area expansion apparatus according to the first embodiment.

In FIG. 8, an address generation unit 801 comprises a two-dimensional address generation unit 811 for generating a two-dimensional address that indicates a pixel position of a reference block in a rectangular area comprising 48 pixels×48 pixels; and a one-dimensional address generation unit 812 for deciding whether the pixel is within or outside a reference frame area on the basis of the two-dimensional address, and generating a one-dimensional address corresponding to the two-dimensional address when the pixel is within the reference frame area while generating a one-dimensional address corresponding to the two-dimensional address after area expansion, when the pixel is outside the reference frame area. The address generation unit 801 outputs a logical address 802 that successively indicates all pixel data in the reference block starting from a logical start address 803 that is generated first from the one-dimensional address generation unit 812, and the logical start address 803 corresponding to a pixel at the upper-left corner of the reference block in a logical space that is laid out on the previous frame.

A memory 807 stores pixels in the reference block, which are located within the reference frame area.

A logical/physical address conversion unit 808 receives the logical address 802 and the logical start address 803, and outputs a physical address 806 that indicates a pixel in the memory 807 corresponding to the logical address.

The logical/physical address conversion unit 808 includes a subtracter 804 for subtracting the logical start address 803 of the pixel that is located at the upper-left corner of the reference block, from the logical address 802 that successively indicates all pixel data in the reference block; and a converter 805 for converting an address outputted from the subtracter 804 into the physical address 806.

A control unit 809 controls the data processing unit 810 and the address generation unit 801.

The data processing unit 810 subjects image data to a coding or decoding process.

Next, the area expansion method will be described with reference to FIGS. 4 to 8.

When the logical address 802 and the logical start address 803 are inputted from the address generation unit 801 to the logical/physical address conversion unit 808, the subtracter 804 subtracts the logical start address 803 from the logical address 802 in a reference block Q602 having a pixel Q603 as the logical start address 803, to be converted into a logical address of a reference block R605 having a pixel R604 as a logical start address.

Figure 1:
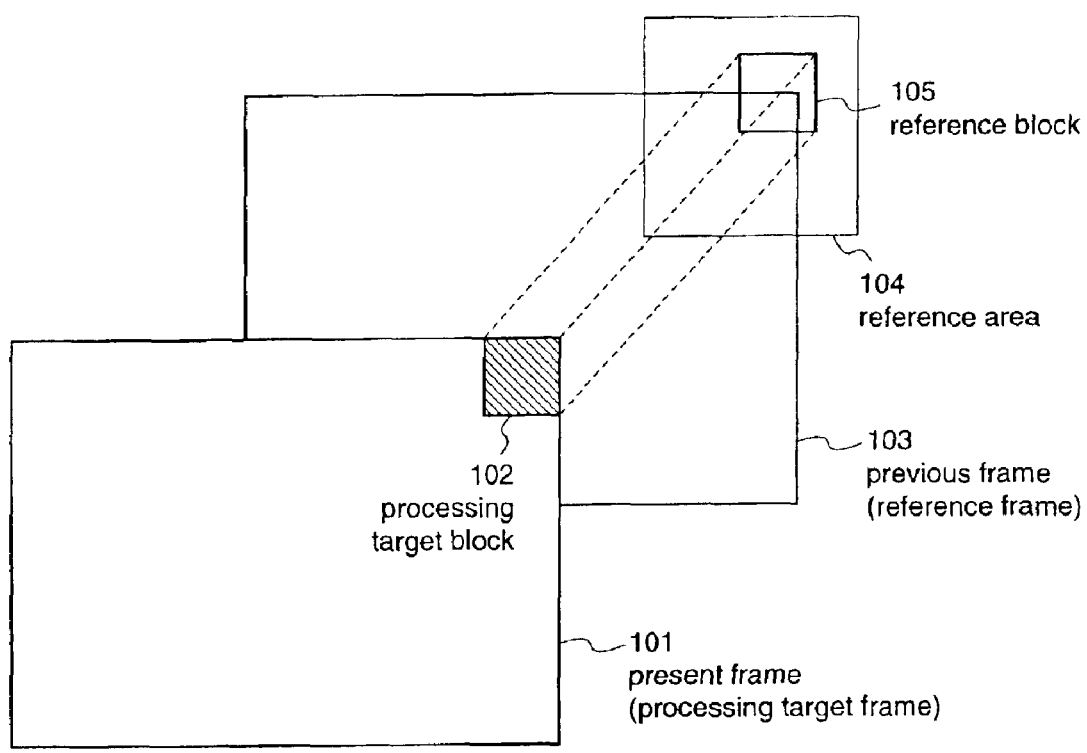
FIG. 1 is a diagram for explaining a block matching processing.
Figure 2:
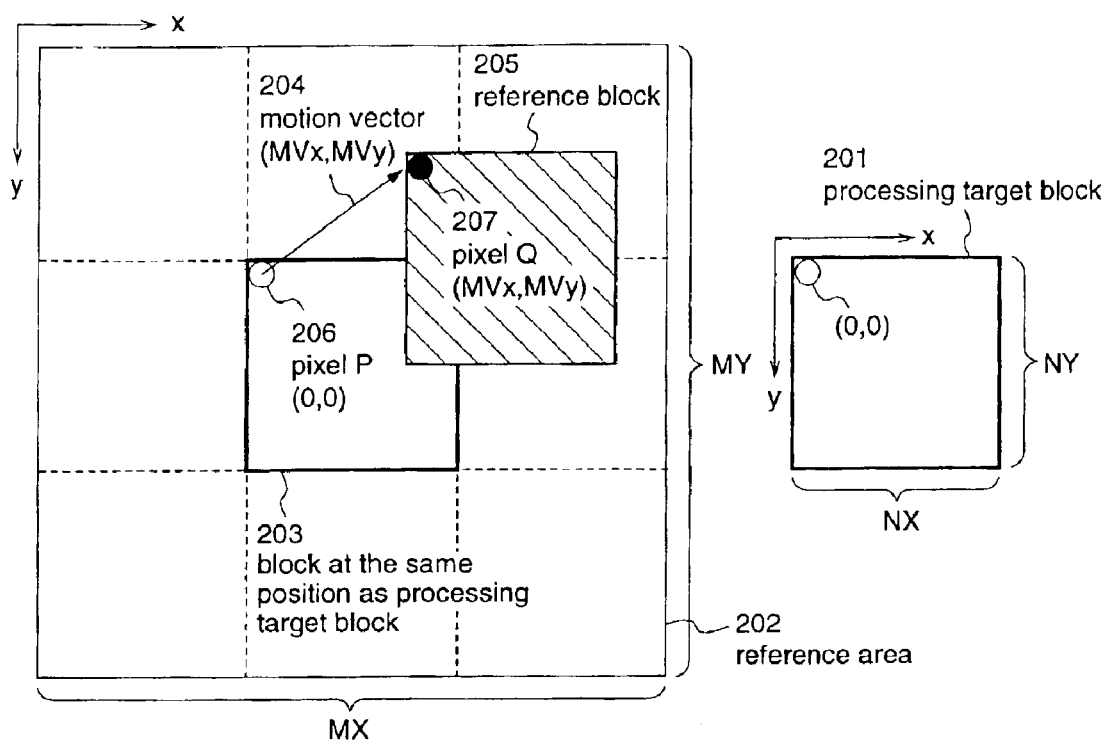
FIG. 2 is a diagram for explaining a motion vector detection process and a motion compensation process.
Figure 3:
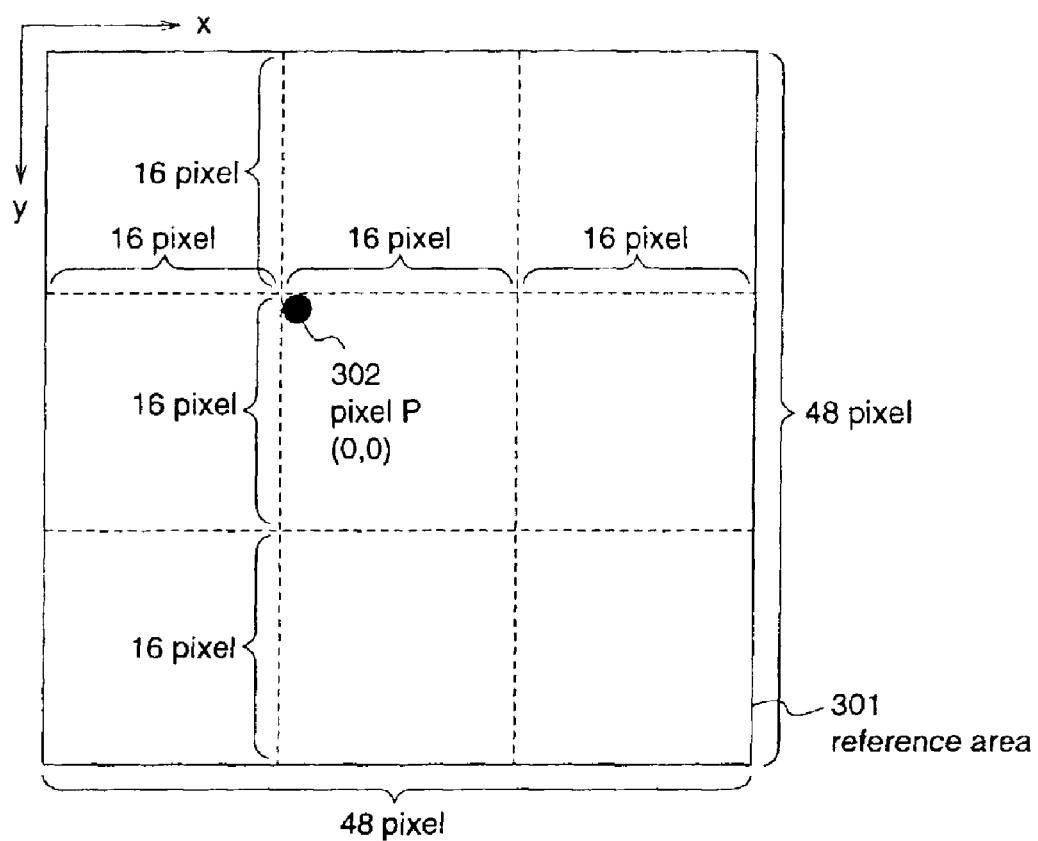
FIG. 3 is a diagram illustrating a configuration of a reference area.
Figure 4:
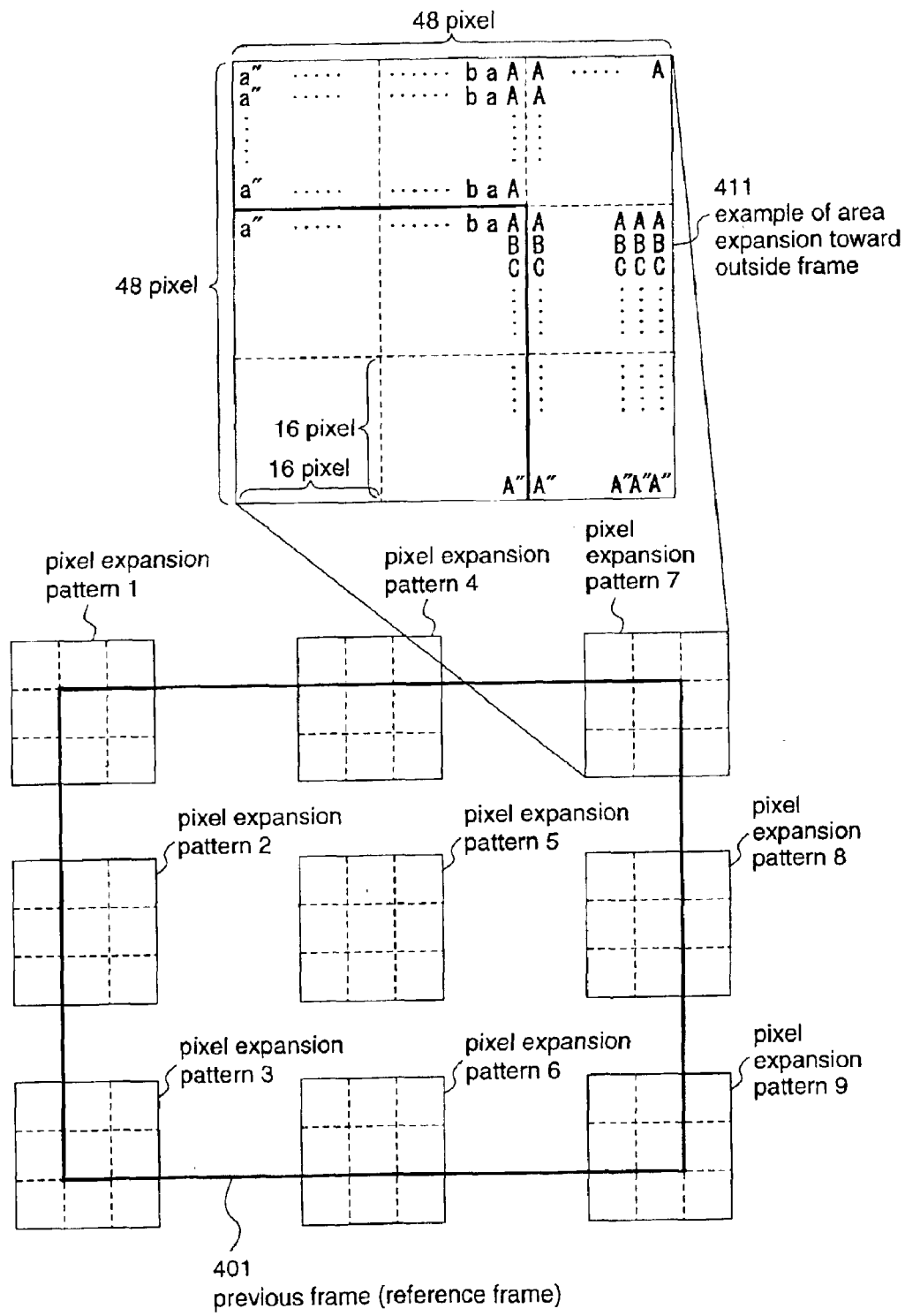
FIG. 4 is a diagram for explaining area expansion.
Figure 5:
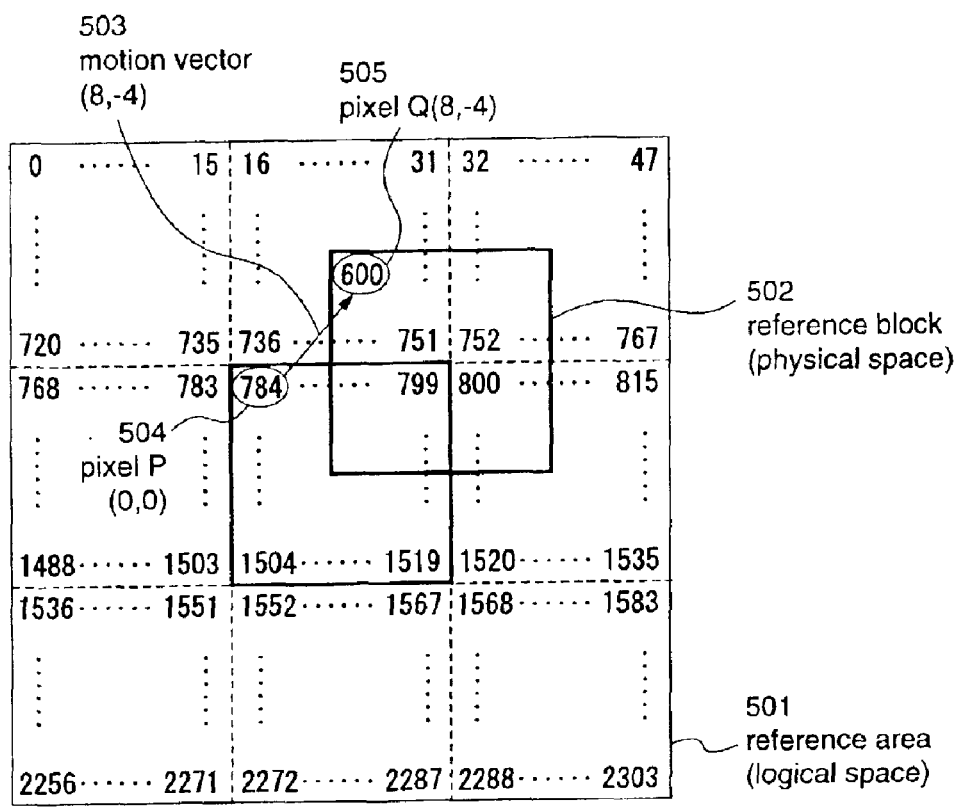
FIG. 5 is a diagram showing an example of memory addresses corresponding to a reference area.
Figure 6:
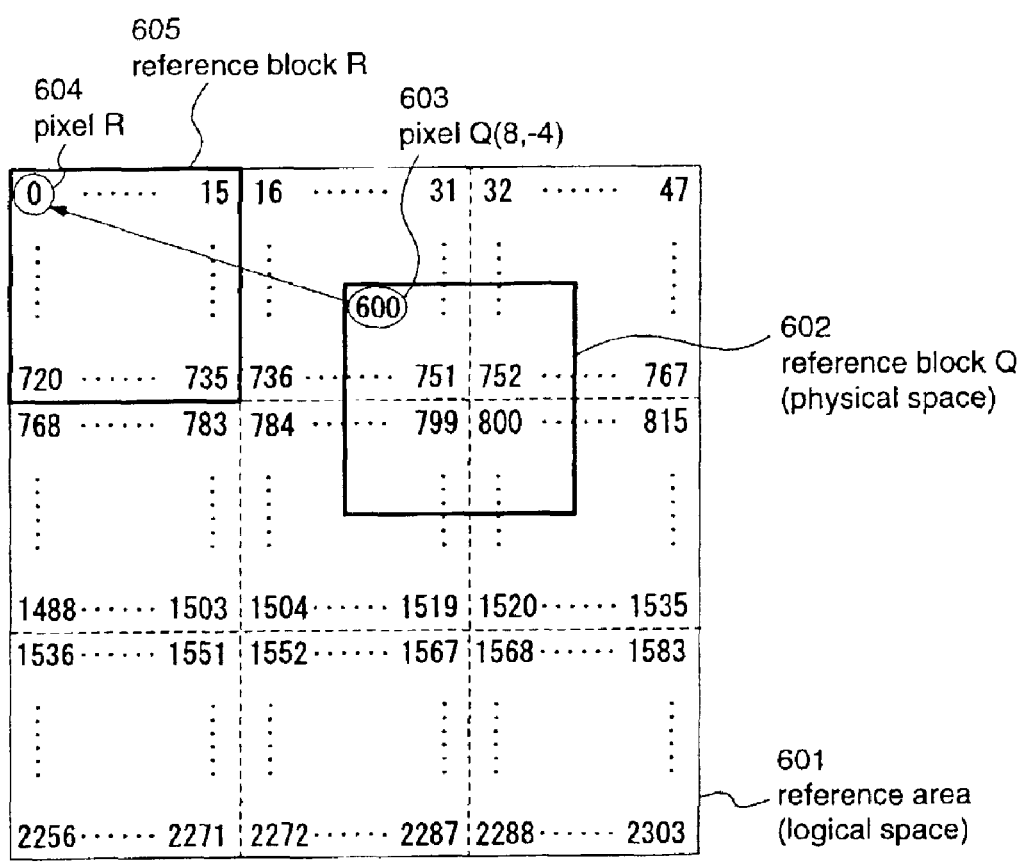
FIG. 6 is a diagram for explaining address conversion.

Now, a description will be given of a case where a motion vector that refers to the outside of the reference frame area, as shown by the example 411 of area expansion toward outside of the frame in FIG. 4, is given when a coded image is to be decoded. At this time, it is required to subject pixels which are located on a frame boundary to the area expansion toward outside of the reference frame area. Then, as shown in FIG. 5, a reference area 501 is laid out on a logical space, and only a reference block 502 is laid out on a physical space. Here, addresses of the logical space are laid out as shown in FIG. 6 so that screen images are laid out in the order of raster, i.e., addresses of 48 pixels (address 0 to address 47) are laid out horizontally on one line, addresses of next 48 pixels (address 48 to address 95) are laid out on the next line, and following addresses up to address 2303 are similarly laid out by repeating the address layout.

Figure 7:
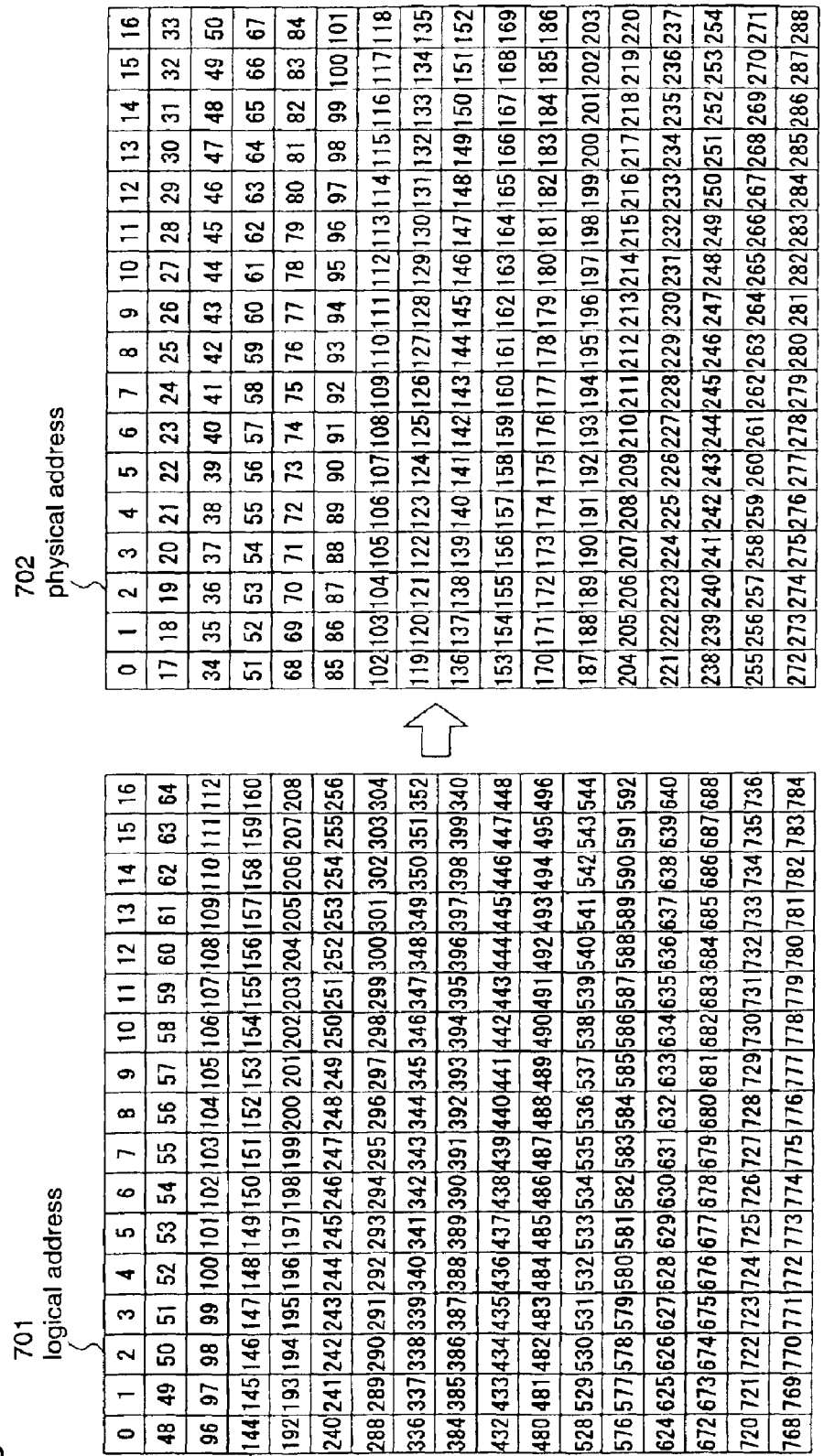
FIG. 7 is a diagram showing a conversion table.

Then, in order to convert the obtained logical address into a physical address, the converter 805 moves a reference block Q602 that is obtained by the subtracter 804 so as to position a pixel Q603 that is located at the upper-left corner of the reference block Q602, at the position of the pixel R604. Here, an example where the motion vector is represented as (8, −4) is shown, while the reference block is similarly moved also in cases where the pixel Q is located at another position, so that the position of the pixel Q is located at the position of the pixel R604. Then, the reference block R605 having the position of the pixel R604 as the logical start address is converted into successive physical addresses in accordance with a table as shown in FIG. 7. Here, a table for converting logical addresses 701 comprising 17 pixels×17 pixels into physical addresses 702 (addresses 0 to 288) is shown, while a table that can position the logical addresses at any positions depending on the capacity of the memory 807 can be set.

Then, the pixels stored in the memory 807 are read from the memory 807 in accordance with the obtained physical addresses 806. In this way, pixel data including an expanded area are obtained.

The area expansion apparatus according to the first embodiment subtracts the logical start address 803 of a pixel that is located at the upper-left corner of the reference block from the logical address 802 which successively indicates all pixel data in the reference block, converts the obtained address into the physical address 806 with referring to the predetermined table, and reads a pixel from the memory 807 in accordance with the physical address. Therefore, while the memory having a capacity that can store 48 pixels×48 pixels is conventionally required when the area expansion is carried out at the motion compensation, the required memory capacity can be reduced to a capacity corresponding to 17 pixels×17 pixels, whereby the area to be expanded is reduced and the consumed power is decreased.

Figure 9:
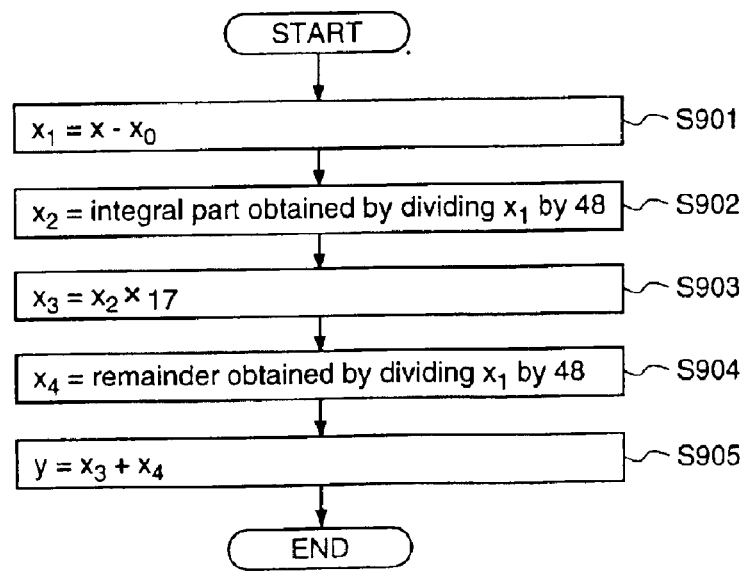
FIG. 9 is a flowchart for explaining an area expansion processing according to the present invention, which is implemented by software.
Figure 10:
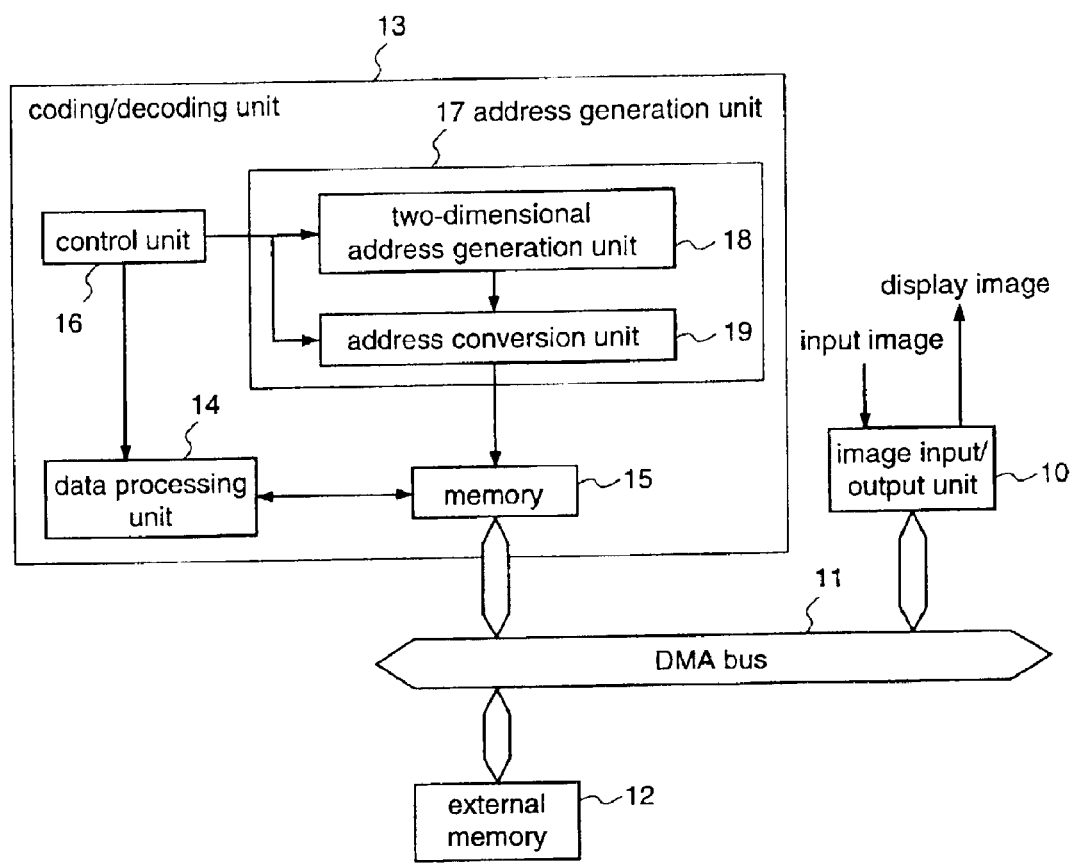
FIG. 10 is a block diagram illustrating an area expansion apparatus which is described in International Application No. PCT/JP99/06997.

In the above descriptions, the image area expansion processing associated with the motion compensation process is carried out by employing the area expansion apparatus as shown in FIG. 8, while this processing may be implemented by software. In this case, assuming the logical address 802 in FIG. 8 to be x, the logical start address 803 to be $x_0$, and the physical address 806 to be y, the logical start address $x_0$ is subtracted from the logical address x as shown in FIG. 9 (S901). Then, an obtained value $x_1$ is divided by 48 to obtain an integral part $x_2$ of an obtained quotient (step S902). The integral part $x_2$ is multiplied by 17 to obtain a value $X_3$ (S903). On the other hand, a remainder $X_4$ of the above quotient is obtained (S904). The remainder $x_4$ and the value $X_3$ are added to obtain the physical address y (S905). Consequently, the logical address can be converted into the physical address by using a translation formula, i.e., y={integral part of a result obtained by dividing (x−$x_0$) by 48}×17+{remainder of the result obtained by dividing (x−$x_0$) by 48}.

What is claimed is:

1. An area expansion apparatus which, when generating a reference block comprising plural pixels which are based on a motion vector in a reference area of a previous frame that is temporally antecedent to a present frame in a process for decoding a processing target block comprising plural pixels in the present frame area, expands the pixels of the reference block toward an area outside of the previous frame area when the reference block extends outside the previous frame area, comprising:

a memory for storing pixels in the reference block, located within a previous frame area; and a logical/physical address conversion unit for receiving a logical start address corresponding to a pixel at an upper-left corner of the reference block and a logical address that successively indicates all pixel data in the reference block starting from the logical start address, in a logical space that is laid out on the previous frame, and for outputting a physical address that indicates a pixel corresponding to the logical address in the memory, said pixels stored in the memory being readable in accordance with the physical address.

2. The area expansion apparatus of claim 1, wherein the logical/physical address conversion unit comprises:

a subtracter for subtracting the logical start address corresponding to a pixel that is located at the upper-left corner of the reference block, from the logical address that successively indicates all pixel data in the reference block; and a converter for converting the address outputted from the subtracter into the physical address.

3. An area expansion method for, when generating a reference block comprising plural pixels which are based on a motion vector in a reference area of a previous frame that is temporally antecedent to a present frame in a process for decoding a processing target block comprising plural pixels in the present frame area, expanding the pixels of the reference block beyond the previous frame area when the reference block extends outside the previous frame area, comprising:

temporarily storing pixels in the reference block, located within the previous frame area;

converting a logical address that successively indicates all pixel data in the reference block starting from a logical start address corresponding to a pixel that is located at an upper-left corner of the reference block, in a logical space that is laid out on the previous frame, into a physical address that indicates the temporarily stored pixel corresponding to the logical address; and reading the temporarily stored pixels in accordance with the physical address.

4. The area expansion method of claim 3, wherein in the conversion of the logical address into the physical address, the logical start address corresponding to a pixel that is located at the upper-left corner of the reference block is subtracted from the logical address that successively indicates all pixel data in the reference block, and an address obtained by the subtraction is converted into the physical address.

5. An area expansion program for enabling a computer to implement a process, when generating a reference block comprising plural pixels which are decided in accordance with a motion vector in a reference area of a previous frame that is temporally antecedent to a present frame in a process for decoding a processing target block comprising plural pixels in the present frame area, for expanding the pixels of the reference block beyond the previous frame area when the reference block extends outside the previous frame area, said processing comprising:

temporarily storing pixels in the reference block, located within the previous frame area;

converting a logical address that successively indicates all pixel data in the reference block starting from a logical start address corresponding to a pixel that is located at an upper-left corner of the reference block, in a logical space that is laid out on the previous frame, into a physical address that indicates the temporarily stored pixel corresponding to the logical address; and reading the temporarily stored pixels in accordance with the physical address.

* * * * *